United States Patent

[11] 3,618,866

| [72] | Inventor | Lloyd B. Robinson<br>2614 Walnut St., Alton, Ill. 62002 |
|---|---|---|
| [21] | Appl. No. | 852,395 |
| [22] | Filed | Aug. 22, 1969 |
| [45] | Patented | Nov. 9, 1971 |

[54] MOBILE SCRAP RECLAMATION
6 Claims, 1 Drawing Fig.

[52] U.S. Cl.................................................. 241/101 M
[51] Int. Cl.................................................. B02c 21/02
[50] Field of Search........................................ 241/101,
DIG. 23, DIG. 22; 214/41; 100/DIG. 1

[56] References Cited
UNITED STATES PATENTS

| 3,335,968 | 8/1967 | Young | 241/80 X |
|---|---|---|---|
| 786,168 | 3/1905 | Smith | 241/101 X |
| 1,506,907 | 9/1924 | Jackson | 241/101 X |
| 2,675,718 | 4/1954 | Finney | 214/41 X |
| 3,103,163 | 9/1963 | Gates | 100/DIG. 1 |
| 3,356,016 | 12/1967 | Eidal | 241/193 X |
| 3,409,235 | 11/1968 | Quinn | 241/101 X |
| 3,489,301 | 1/1970 | Miller et al. | 214/41 |

FOREIGN PATENTS

| 128,549 | 1/1879 | France | 241/101 |
| 1,347,867 | 11/1963 | France | 241/101 |

*Primary Examiner*—Theron E. Condon
*Assistant Examiner*—R. C. Riordon
*Attorney*—Spencer & Kaye ABSTRACT: A method for processing scrap metal at sites not justifying the expense of permanent scrap-processing equipment utilizes a mobile metal reclamation unit including scrap-processing apparatus mounted on railroad cars which are moved to sites containing a limited amount of bulky scrap materials. The scrap material is then formed into more compact scrap material with the apparatus mounted on railroad cars, and upon completion of processing of the scrap material the apparatus may be moved to other sites also containing limited amounts of bulky scrap metal items.

PATENTED NOV 9 1971      3,618,866
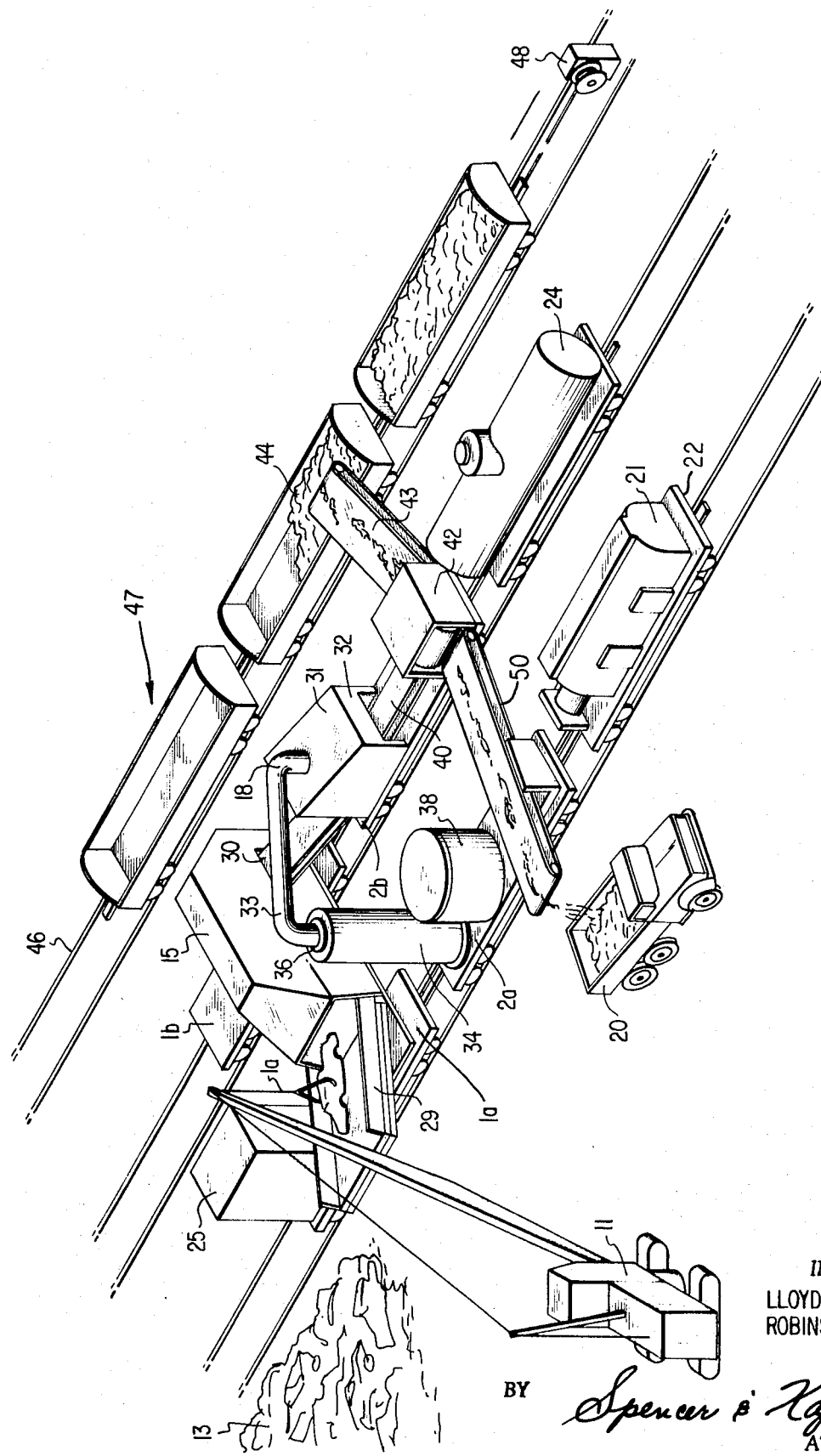
INVENTOR
LLOYD B. ROBINSON
BY *Spencer B. Kaye*
ATTORNEYS.

MOBILE SCRAP RECLAMATION

BACKGROUND OF THE INVENTION

This invention relates to a method and apparatus for processing scrap metal, and more particularly to such a method and apparatus in which apparatus may be moved on railroad cars to a site containing limited amounts of bulky scrap metal items.

In recent years, scrap metal has accumulated in various areas of the country in the form of large bulky items, principally auto hulks. In many cases, the value of the scrap to be obtained does not justify the expense of processing them with existing equipment. While such items as automobile hulks and home appliances contain large amounts of potentially useful scrap material, the usable materials, such as the metals, must be separated from nonusable materials, such as padding, paint and grease. Different types of scrap, such as ferrous and nonferrous metals, must be separated. Bulky items must be made sufficiently compact to warrant the expense of transportation. In certain large metropolitan areas, extremely expensive machinery which is capable of automatically compacting, shredding and separating nonusable materials has been developed. However, even the most inexpensive of this equipment may cost several hundred thousand dollars. Only a very few large dealers located in large metropolitan areas may have enough scrap automobiles, etc., available to keep such machinery continuously in use. Smaller dealers find themselves unable to economically compete with such large dealers and, in the smaller cities, the cost of transporting such scrap material, autos, or other large bulky items, becomes prohibitively expensive in view of the relatively limited value of the scrap which can be obtained from a particular unit.

SUMMARY OF THE INVENTION

Among the objects of the present invention is the provision of a method by which it is economically feasible to process scrap automobiles and other large bulky scrap metal items at locations not justifying the expense of permanent installation of scrap-processing equipment.

Briefly stated, this and other objects of the invention are achieved by providing railroad cars upon which the scrap-processing equipment is located, moving the cars to a location at which a limited amount of scrap is to be processed, and processing the scrap. Upon the conclusion of the scrap processing, the railroad cars may be moved to another site.

BRIEF DESCRIPTION OF THE DRAWING

FIG. 1 is a perspective view showing, somewhat schematically, apparatus according to the present invention being used to form compact scrap material from automobile hulks.

DESCRIPTION OF A PREFERRED EMBODIMENT

Referring now to the drawing, a mobile reclamation unit according to the present invention consists of scrap-processing apparatus mounted on railroad cars which may be readily moved to a location, be quickly set up, process cars and other bulky scrap items there located, and move on. The unit includes a mobile crane 11 which delivers automobile hulks from a scrap heap 13 to a ripper unit 15 located on flat cars 1a and 1b. The ripped automobile pieces are delivered to a shredder and separator unit 18 located on cars 2b and 2a. Here dirt and nonferrous materials are separated from shredded steel; the shredded and cleansed steel is then carried to a gondola car 44 which carries away the processed material. The remaining material is delivered to a trash truck 20. A diesel electric power generator unit 21 is mounted on a car 22 and a tank car 24 contains fuel for the unit. A control center 25 contains controls from which an operator may control the various equipment.

The mobile crane 11 is of appropriate size to be carried upon a railroad flatcar.

The ripper unit 15 may be of the type manufactured by the Ripsteel Corporation illustrated in a brochure issued by the Ripsteel Corporation designated "High Production Auto Preshredding at Slow Speed" and described in U.S. Pat. No. 2,894,697, except that it is modified to be mounted upon two flatcars 1a and 1b. During transportation one of the flatcars 1b carries the portion of the ripper which performs the actual ripping operation. The other car 1a carries accessory equipment such as the automobile hulk input chute 29 and the conveyor 30 which delivers the ripped automobile parts to the shredder unit 18. Upon reaching the scrap-processing site, the two cars are placed on side-by-side tracks and the respective portions of the ripper unit are connected together. The two cars are appropriately braced with respect to the earth so as to give the ripper unit a wide support base.

The shredder and separator unit 18 includes a hammer mill 31 mounted within a housing 32 mounted on flatcar 2b. A duct 33 connects the hammer mill housing 32 to a dust collector unit 34 which includes a blower 36. Dust collector 34 utilizes a centrifugal and water spray air cleaning action. Water is supplied from a water storage tank 38 mounted, like dust collector 34, a flatcar 2a. The dust collector is of a conventional type in which water is continuously recirculated after dust sludge is removed.

Shredded pieces are delivered from housing 32 via a conveyor 40 to a magnetic drum separator 42 which lifts ferrous parts off the conveyor and delivers them to a scrap conveyor 43 which carries them to the gondola car 44 mounted on an adjacent track 46. At a loading point 47, a series of empty gondola cars 44 may be placed on track 46, and successively moved from loading point 47 by an automatic car puller 48 which may be a motor-driven winch transported to the site on a railroad car and then positioned rigidly on the ground in advance of the line of the cars so that, in response to control from the control center 25, cars are moved as necessary.

A trash conveyor 50 is mounted on car 2a and arranged to receive such automobile pieces as are not removed by the magnetic separator 42. Such trash may be delivered to a trash truck 20, or otherwise disposed of. Nonferrous metal parts, and other parts having economic value, may be picked from conveyor 50 by a workman standing on car 2a.

The processed scrap within the gondola car can be incinerated at some other location to remove grease, paint, and dirt and adhering nonferrous parts in order to produce clean metal scrap suitable for steel mill use. If desired, a conventional, closed incinerator might be mounted on an incinerator car arranged to receive material from scrap conveyor 43 and deliver it, after burning, to the gondola cars 44.

The various components are conventional automobile scrap-processing equipment, redesigned only so as to fit on railroad cars, although the particular combination and arrangement of the components is new. Many of these components are illustrated and described in a brochure recently issued by the David J. Joseph Co., Cincinnati, Ohio designated "A Practical Approach to Auto Scrap," which describes its Tampa Florida plant. The shredder was manufactured to the Joseph Company's designs by Hammermills, Inc., a division of Pettibone Mulliken Corp. The conveyors were manufactured by Bonded Scale and Machine Co. A suitable incinerator was manufactured by the Joseph Co., as was the dust collector. The magnetic separator utilizes magnets operated by a rectifier and was manufactured by the Indiana General Corp.

It will be appreciated that one of the advantages of the invention is that it permits operations, such as incineration, which might not be permitted or be desirable in some areas to be performed at other areas, after the original bulky mass of automobiles or scrap items are reduced to compact shape. On the other hand, the mounting of the various scrap-processing units on separate cars permits assembly of a processing unit which is adapted to the particular site. Both the changing local regulations and varying physical layouts of particular sites may be accommodated.

The diesel generator unit permits generation of electrical power in areas in which the local utility service may not be able to supply appropriate power for operation of the particular units, and the use of the tank cars avoids inconvenient fuel supply situations.

The unit also lends to flexibility in a business sense in that it makes economically feasible scrap-processing operations at locations which are now too dispersed for economic use of present processing equipment. The unit might be leased by independent scrap operators for limited periods of time, or owned by cooperatives of independent dealers or by chains who move the unit around to a series of sites on a regular schedule. It might also be owned by a scrap dealer, or by a steel mill which moves the unit to sites at which it has purchased scrap and then processes it to its own specifications. It might also be utilized by governmental authorities simply interested in the removal of abandoned scrap heaps. Where appropriate smaller machines may be adapted for use on single cars on a single track sliding.

It will be understood that the above description of the present invention is susceptible to various modifications, changes and adaptations.

I claim:

1. A mobile scrap reclamation unit comprising, in combination:
   a. a first railroad car;
   b. first means mounted on said first railroad car for transferring bulky items including metallic and nonmetallic materials;
   c. a second railroad car;
   d. second means mounted partly on said first railroad car and partly on said second railroad car for receiving said bulky metal items from said first means, and for ripping said items into separate pieces;
   e. a third railroad car;
   f. third means mounted partly on said second railroad car and partly on said third railroad car for transferring said separate pieces;
   g. fourth means mounted on said third railroad car for receiving said separate pieces from said third means and for shredding said separate pieces into smaller pieces;
   h. fifth means for transferring said smaller pieces away from said fourth means;
   i. sixth means for receiving said smaller pieces from said fifth means and for separating said nonmetallic material from said metallic material.
   j. conveyor means for carrying said metallic material and said nonmetallic material to separate, respective transport vehicles;
   k. said first, second, and third railroad cars being positioned on first track means and said transport means which receive the metallic material being railroad cars which are positioned on second track means.

2. A method of processing bulky scrap items including metallic and nonmettalic material at sites not justifying the expense of permanent scrap processing equipment comprising, in combination, the steps of:
   a. mounting scrap processing apparatus onto a plurality of railroad cars;
   b. transporting said railroad cars to said sites;
   c. arranging said railroad cars in adjacent order;
   d. moving a plurality of loading cars for the receipt of processed scrap material on railroad tracks to a loading point adjacent the tracks containing the scrap processing cars;
   e. assemble said apparatus on said railroad cars for receiving said bulky items, ripping said bulky items into separate pieces by apparatus mounted on a first pair of said railroad cars, conveying said ripped pieces to another of said railroad cars, shredding said ripped pieces to form shreds by apparatus on said another of said railroad cars, separating metallic shreds from nonmetallic shreds by apparatus on said another of said railroad cars, and delivering said shreds to said loading point.
   f. loading the metallic scrap on a first loading car, removing said first car after it is filled with scrap at the loading point, moving a second loading car to the loading point and filling the second loading car with metallic scrap; and
   g. removing said railroad cars with the scrap-processing apparatus thereon from the first site containing limited amounts of bulky scrap items upon the completion of said processing to a second site containing limited amounts of bulky scrap items and repeating steps c–f.

3. The combination defined in claim 1, including railroad car pulling means fixedly positioned with respect to said second track means for moving empty railroad cars into position to receive said metallic material and moving said cars away from said position after they are filled.

4. The combination defined in claim 1 in which at least one of said second, fourth, or sixth means is run by electric power and including a separate railroad car on which an electric power generator unit is mounted.

5. The combination defined in claim 1 in which said fourth means include dust-collecting means.

6. The method of claim 2, including the step of running at least one of said ripping, shredding and separating apparatus by electricity, and generating said electric power by an engine generator unit located on a railroad car.

* * * * *